(12) United States Patent
Battlogg

(10) Patent No.: US 11,360,503 B2
(45) Date of Patent: Jun. 14, 2022

(54) HAPTIC OPERATOR CONTROL DEVICE FOR A VEHICLE, AND METHOD

(71) Applicant: INVENTUS ENGINEERING GMBH, St. Anton I.M. (AT)

(72) Inventor: Stefan Battlogg, St. Anton I.M. (AT)

(73) Assignee: INVENTUS Engineering GmbH, St. Anton (AT)

(*) Notice: Subject to any disclaimer, the term of this patent is extended or adjusted under 35 U.S.C. 154(b) by 0 days.

(21) Appl. No.: 17/195,941

(22) Filed: Mar. 9, 2021

(65) Prior Publication Data

US 2021/0278872 A1    Sep. 9, 2021

(30) Foreign Application Priority Data

Mar. 9, 2020 (DE) ............ 10 2020 106 328.8

(51) Int. Cl.
*G05G 5/03* (2008.04)
*G05G 1/10* (2006.01)

(52) U.S. Cl.
CPC .......... *G05G 5/03* (2013.01); *G05G 1/10* (2013.01)

(58) Field of Classification Search
None
See application file for complete search history.

(56) References Cited

U.S. PATENT DOCUMENTS

| 9,091,309 B2 | 7/2015 | Battlogg |
| 10,808,773 B2 | 10/2020 | Battlogg |
| 2020/0355229 A1 | 11/2020 | Battlogg |

FOREIGN PATENT DOCUMENTS

| CN | 108930731 A | 12/2018 |
| DE | 112004002908 B4 | 6/2010 |
| DE | 102010055833 A1 | 3/2012 |
| DE | 102018100390 A1 | 7/2019 |
| WO | 2012034697 A1 | 3/2012 |

*Primary Examiner* — Vicky A Johnson
(74) *Attorney, Agent, or Firm* — Laurence A. Greenberg; Werner H. Stemer; Ralph E. Locher

(57) ABSTRACT

A haptic operator control device for a motor vehicle has a magnetorheological brake with a brake component that is fixed to a holder and a brake component that is continuously rotatable relative to the fixed brake component. A first of the brake components extends in an axial direction and has a magnetically conductive core which extends in the axial direction, and a second brake component has a hollow shell part that encircles the first brake component. An encircling gap between the brake components is filled with a magnetorheological medium. An electrical coil is accommodated in the brake housing. At least one star contour with magnetic field concentrators formed thereon is arranged between the shell part and the core. The magnetic field concentrators project radially into the gap to define a varying gap height in a region of the star contour.

23 Claims, 4 Drawing Sheets

HAPTIC OPERATOR CONTROL DEVICE FOR A VEHICLE, AND METHOD

CROSS-REFERENCE TO RELATED APPLICATION

This application claims the priority, under 35 U.S.C. § 119, of German Patent Application DE 10 2020 106 328.8, filed Mar. 9, 2020; the prior application is herewith incorporated by reference in its entirety.

BACKGROUND OF THE INVENTION

Field of the Invention

The invention relates to a haptic operator control device for vehicles and in particular motor vehicles, having at least one magnetorheological brake device with a static holder and with at least two brake components and/or damper components. The haptic operator control device according to the invention with the magnetorheological brake device can be used for a variety of purposes in motor vehicles. The haptic operator control device according to the invention may for example be used for the operator control of technical devices in vehicles, for example as a rotary actuator; rotary/push actuator; for infotainment, the air-conditioning system (temperature, fan speed, distribution . . . ), as a transmission selector switch, for navigation, for cruise control, for adaptive cruise control, for the seat adjustment, in the steering system or in the steering wheel, for chassis adjustment, for the driving mode adjustment, for the windshield wiper setting, as a window or sliding roof actuator, as a parking assistant or for setting (partially) autonomous driving or as a steering wheel substitute etc.

Magnetorheological fluids have, for example, superfine ferromagnetic particles, such as for example carbonyl iron powder, distributed in an oil. In magnetorheological fluids, approximately round or spherical particles with a production-related diameter of 1 to 10 μm are used, wherein the particle size and shape is non-uniform. If such a magnetorheological fluid is subjected to a magnetic field, the carbonyl iron particles of the magnetorheological fluid interlink along the magnetic field lines, such that the rheological characteristics of the magnetorheological fluid (MRF) are influenced considerably (transmissible shear stresses) in a manner dependent on the form and strength of the magnetic field.

My earlier, commonly assigned patent No. U.S. Pat. No. 9,091,309 B2 and its counterpart International patent application WO 2012/034697 A1 describe a magnetorheological transmission device which has two couplable components, the coupling strength of which can be influenced. To influence the coupling strength, a channel with a magnetorheological medium is provided. The magnetorheological medium in the channel is influenced by means of a magnetic field. In the channel, there are provided rotary bodies on which there are provided acute-angled regions which contain the magnetorheological medium. The channel or at least a part thereof can be subjected to the magnetic field of a magnetic field generating device in order to selectively (magnetically) interlink the particles, and cause them to become jammed with the rotary bodies, or release said particles. This magnetorheological transmission device may also be used in a rotary dial for the operator control of technical appliances. Such a magnetorheological transmission device functions and allows the transmission of extremely high forces or torques whilst at the same time having a relatively small structural form or structural volume.

The said U.S. Pat. No. 9,091,309 B2 also discloses a rotary dial or operator control dial in the case of which the dial itself is attached so as to be rotatable about a shaft. The braking moment can be controlled by means of the magnetic field generated by an electrical coil. If a higher braking moment that can be generated is desired, then it is also possible, instead of spherical rotary bodies, for cylindrical rollers to be used such that the magnetic field acts over a longer distance or over a larger area (magnetic field concentration and wedge formation occurs over a larger area). In particular in the case of rotary or operator control dials of relatively small diameter, it has been found that a lengthening of the rolling bodies does not inevitably lead to an increase of the maximum braking moment that can be generated. It has been found that this is because the magnetic field is closed by, or must pass through, the central shaft. The small diameter of the shaft limits the braking moment that can be generated, because the magnetic field required for the braking action is quickly saturated in the (shaft) material. The material through which the magnetic field flows does not allow any further increase in magnetic flux, as a result of which it is also not possible for a stronger magnetic field to reach the rollers. The smallest cross section through which the magnetic field flows in the magnetic circuit as a whole defines the maximum possible magnetic flux and thus the maximum braking moment in the brake device. The use of relatively long rollers as rotary bodies can then even have an adverse effect on the braking moment that can be generated, because the magnetic field is distributed over the longer roller surface. A lower field strength prevails (low magnetic field concentration). Because the achievable braking action is not linearly dependent on the magnetic field but rather increases disproportionately in the presence of stronger magnetic fields, the achievable braking action accordingly decreases disproportionately in the presence of weaker magnetic fields.

BRIEF SUMMARY OF THE INVENTION

It is therefore the object of the present invention to provide a haptic operator control device having a magnetorheological brake device for vehicles, which haptic operator control device in particular allows a high braking moment (torque), or a higher braking moment (torque) than is the case in the prior art, even in the case of small or even very small diameters.

With the above and other objects in view there is provided, in accordance with the invention, a haptic operator control device for a vehicle, the control device comprising:

a magnetorheological brake device with a brake housing having a static holder and with at least two brake components, wherein one of said brake components is connected rotationally conjointly with said holder and said two brake components are continuously rotatable relative to one another;

said two brake components including a first brake component extending in an axial direction and having a core that extends in the axial direction and that is composed of a magnetically conductive material, and a second brake component having a hollow shell part that extends around said first brake component;

a magnetorheological medium at least partially filling an encircling gap formed between said first and second brake components;

at least one electrical coil accommodated in said brake housing;

at least one star contour arranged between said shell part and said core, said at least one star contour having magnetic field concentrators formed thereon, with said magnetic field concentrators projecting radially into said encircling gap, forming said encircling gap with a varying gap height in a region of said at least one star contour.

In other words, a haptic operator control device for vehicles and in particular motor vehicles according to the invention comprises at least one magnetorheological brake device with a brake housing and has a static holder and at least two brake components. One of the two brake components is connected rotationally conjointly to the holder, and the two brake components are continuously rotatable relative to one another. A first brake component extends in an axial direction and comprises a core which extends in the axial direction and which is composed of a magnetically conductive material. The second brake component comprises a shell part which is of hollow form and which is rotatable about the first brake component. An encircling gap which is at least partially and in particular completely filled with a magnetorheological medium is formed between the first and the second brake component. Here, the magnetorheological medium wets the brake components. A (at least one) electrical coil is accommodated in the brake housing. At least one star contour with magnetic field concentrators formed thereon is arranged or accommodated between the shell part and the core, which magnetic field concentrators project radially into the gap such that an encircling gap with a varying gap height (over the circumferential angle) is formed in the region of the star contour.

The first brake component defines an axial direction. The first brake component may however also be formed so as to be at least locally angled relative to the axial direction. The statement that the core of the first brake component extends in the axial direction is to be understood in the context of the present invention to mean that the core extends at least inter alia substantially in the axial direction. The core may have a course which has a slight angle with respect to the axial direction. For example, the core may also be oriented at an angle of 2.5° or 5° or 10° or 15° with respect to the axial direction. The winding of the electrical coil may be oriented radially around the core or may also be oriented (likewise not exactly) in the axial direction around the core. The electrical coil may also be at an angle of 5° or 10° or 15° or similar with respect to the axial or radial direction. In the case of an axial winding of the electrical coil around the core, it is preferred that an angle between the orientation of the core and the axial direction and an angle of the winding of the electrical coil with respect to the axial direction is less than 20°, and in particular less than 10°.

The haptic operator control device according to the invention for vehicles has numerous advantages. A major advantage of the haptic operator control device according to the invention for vehicles consists in that a high braking moment (high shear stresses) can be generated by means of the star contour or star-like contour with the magnetic field concentrators.

A particular advantage arises from the fact that the magnetic field concentrators are fixedly connected to the core and/or to the shell part, and in particular formed integrally therewith. A particularly simple and inexpensively producible construction is thus made possible with little outlay in terms of assembly. It has surprisingly been found that the magnetic field concentrators do not need to be designed to themselves be rotatable, or as rotatable rolling bodies, but rather that even static magnetic field concentrators reliably and reproducibly provide an intense increase of the braking moment that can be generated.

The magnetic field concentrators may either be separately manufactured and connected to the star contour, or may be directly fixedly connected, and for example screwed, riveted, soldered, welded or possibly even adhesively bonded to, or pressed together with, the core or the shell part. Astonishingly, it is also possible for the magnetic field concentrators to be attached to the shell part. Altogether, a high braking moment is generated in a small (and even smaller) structural space. In this way, the braking moment can be increased overall, or can be kept the same with a smaller structural space. New possibilities are also opened up, because a greater braking moment than before can be generated with a considerably smaller structural space.

A haptic operator control device according to the invention is provided for use in all types of vehicles. In particular in motor vehicles. Use is also possible on motorcycles. The invention may be used in on-highway and off-highway vehicles. The haptic operator control device according to the invention may be used in and on vehicles for travel on land and air travel. Self-driving vehicles and (partially) autonomous vehicles, taxis, robot taxis can be equipped therewith.

In the context of the present invention, a star contour is also to be understood to mean a star-like contour. A star contour within the meaning of the present invention has radially projecting contour elements as magnetic field concentrators. In particular, a local radius is greater at a contour element than at a location adjacent thereto in a circumferential direction. The maximum local radius is, there, preferably greater by at least 0.1%, and in particular at least 0.25% (and preferably more), than a minimum local radius adjacent thereto in a circumferential direction. It is preferable for multiple contour elements to be formed over the circumference.

The electrical coil is preferably wound around at least one section of the core, such that a magnetic field of the electrical coil runs through the core and the magnetic field concentrators and through the (axially and/or radially extending) gap into a wall of the shell part.

Preferably, the magnetic field or the magnetic field lines run(s) transversely through the first or inner brake component. A lengthening of the first brake component then, in the case of an unchanged diameter, increases the possible magnetic flux and thus the braking moment. The core diameter, which normally cannot be made larger for structural reasons, then does not restrict the magnetic flux.

In the magnetorheological brake device, the magnetic field concentrators form transmission components. The magnetic field concentrators or the transmission components are at least partially, and in particular substantially completely or completely, surrounded by a magnetorheological medium. Overall, it is preferable for a magnetorheological fluid to be used as magnetorheological medium.

It is preferable for multiple magnetic field concentrators (as transmission components) to be arranged so as to be distributed over the circumference of the gap. The magnetic field concentrators are not in themselves rotatable but rotate with the brake component to which they are fastened. A relative movement thus occurs in the gap during a rotation.

It is possible for yet further transmission components, which are for example in the form of rolling bodies, to also be included in addition to the magnetic field concentrators or instead of individual segments of the star contour. In the context of the present invention, the expression "rolling body" is to be understood to mean a rotary body which is suitable for rolling, in the gap, on the first or second brake component.

In a preferred refinement of the invention, at least one magnetic field concentrator has a cross-sectional area which tapers toward the distal end.

Preferably, at least one magnetic field concentrator is of rounded form at the distal end.

It is preferred that the core comprises a multiplicity of arms and/or the shell part comprises a multiplicity of arms as magnetic field concentrators, which project radially and/or axially. From the core, arms project radially outward and/or axially to the side. From the shell part, arms project preferably radially inward and/or also axially to the side.

In all refinements, it is preferred that at least one arm is surrounded by an electrical coil. It is particularly preferable for a multiplicity of arms to each be surrounded by an electrical coil.

Preferably, a radial length of a (radially projecting) arm is less than a length of the arm in the axial direction.

Preferably, at least one electrical coil is wound around the axis and generates, in the core, substantially a magnetic field in the axial direction (radial coil).

The electrical coil is preferably accommodated radially (in encircling fashion) between the core and the shell part.

In particular, the electrical coil or at least one electrical coil is fastened at the inside to the shell part. Then, the electrical coil is radially spaced apart from the core on the first brake component. It is also possible and preferable for at least one electrical coil to be wound around the core. An electrical coil may be wound radially around the core. It is also possible for the electrical coil to be wound axially around the core. Then, an axis of symmetry of the electrical coil extends transversely with respect to the longitudinal extent of the first brake component.

In preferred refinements, at least two star contours are accommodated in the brake housing. The star contours may be of identical and in particular also different design.

Preferably, two star contours are accommodated so as to be axially spaced apart from one another. It is also possible for three, four or more star contours to be accommodated so as to be (in each case) axially spaced apart from one another. Each of said star contours may be of identical form or may also have a different shape than the other star contours.

It is preferable for in each case two star contours to be of identical form in pairwise fashion.

At least one star contour is formed in particular as a separate (and preferably hollow) annular flange with radially projecting magnetic field concentrators.

The magnetic field concentrators may be formed so as to project radially outward. Then, the annular flange is preferably connected fixedly (and preferably detachably) to the core.

The magnetic field concentrators may be formed so as to project obliquely outward. Then, the annular flange is preferably connected fixedly (and preferably detachably) to the core.

The magnetic field concentrators may be formed so as to project laterally (axially). Then, the annular flange is preferably connected fixedly (and preferably detachably) to the core.

The magnetic field concentrators may also be formed so as to project radially inward. Then, the annular flange is preferably connected fixedly (and preferably detachably) to the shell part.

The magnetic field concentrators may also be formed so as to project obliquely inward. Then, the annular flange is preferably connected fixedly (and preferably detachably) to the shell part.

The magnetic field concentrators may also be formed so as to project laterally (axially) inward. Then, the annular flange is preferably connected fixedly (and preferably detachably) to the shell part.

Preferably, at least two star contours have a different outer contour. The outer contour may differ for example radially at the inside and/or radially at the outside and/or at at least one axial side.

Preferably, at least one star contour has radially outwardly projecting magnetic field concentrators and is fastened in magnetically conductive fashion to and in particular on the core. For example, the star contour may be secured on the core by clamping or by means of a screw connection.

Preferably, at least one star contour has radially inwardly projecting magnetic field concentrators and is fastened in magnetically conductive fashion to (and in particular in) the shell part.

It is preferable if a magnetic field of the electrical coil runs through the core and at least one star contour with the magnetic field concentrators and through the gap and the wall of the shell part.

If two axially spaced-apart star contours are included, a magnetic field of the electrical coil preferably runs axially through the core, axially through the wall of the shell part and through both star contours with the magnetic field concentrators and the gaps between star contour and core and shell part respectively.

In a particularly preferred refinements, at least one electrical coil is wound in an axial direction around the core and generates substantially a magnetic field in a radial direction (horizontal coil).

In particular, the magnetic field concentrators form an outer contour which is star-shaped (in cross section).

Preferably, the shell part has a cylindrical inner surface over at least one axial section.

Preferably, the electrical coil extends axially around at least one arm. In particular, a radial gap height between an outer end of an arm and an inner surface of the shell part is less than a radial gap dimension between the outer surface of the first brake component adjacent to the arm and the inner surface of the shell part. The surface of the main body may be formed adjacent to the arm. A surface of a potting compound, if this is introduced, may also be adjacent to the arm for example in order to reduce the volume for the magnetorheological medium and in particular magnetorheological fluid (MRF).

Preferably, the second brake component is accommodated in axially displaceable fashion on the first brake component in order to allow volume compensation in the event of temperature changes.

Preferably, a (at least one) closed (and outwardly sealed-off) chamber is formed between the brake components. The second brake component is accommodated and in particular mounted rotatably on the first brake component (at a first bearing point) at a first end of the closed chamber, the closed chamber being substantially or completely filled with the magnetorheological medium.

Preferably, the second brake component is accommodated and in particular mounted axially displaceably on the first brake component, such that a volume of the closed chamber changes as a result of a relative axial displacement of the brake components, in order to provide compensation for temperature-induced changes in volume.

It is advantageous if the electrical coil is wound in an axial direction around the core and generates substantially a magnetic field in a radial direction. There is then the advantage that a stronger braking moment can be generated by lengthening a magnetic field concentrator in an axial direction. Simultaneously with the lengthening of the magnetic field concentrator, it is (expediently) also possible for the electrical coil, which extends in the longitudinal direction of the first brake component, to be lengthened. With an electrical coil which is of longer form in the axial direction, a larger passage area (cross-sectional area flowed through by the magnetic field) is provided for the magnetic field. Therefore, a lengthening of the first brake component in the axial direction also results in an enlargement of the cross section of the core. In this way, a stronger braking moment can be achieved by lengthening the first brake component in the axial direction.

In preferred refinements, at least a part of the magnetic field concentrators is composed of a magnetically conductive material. It is also possible for a part of the transmission components to be composed of a magnetically non-conductive material. If magnetic field concentrators are used which are composed of a magnetically conductive material, and if, at the same time, transmission components are also used which are composed of a magnetically non-conductive material, then the magnetic field concentrates in the region of the magnetically conductive magnetic field concentrators. This leads to the concentration of the magnetic field (increase of the magnetic field strength) and to a local amplification (magnetic field line concentration). For example, the magnetic field strength thus increases, in the gap, from values of less than 350 kA/m up to 1000 kA/m or higher. The (high or) concentrated field strength draws in more carbonyl iron particles from the magnetorheological fluid, and a carbonyl iron accumulation (clustering) occurs. This in turn allows the generation of higher shear stresses and thus braking moments.

Since the relationship between braking moment that can be generated and strength of the magnetic field is not linear, and since the braking moment that can be generated becomes disproportionally even stronger with strengthening magnetic field, it is thus possible to achieve a considerable strengthening of the braking moment that can be generated (with the same structural space/dimensions). It is also possible for the number of magnetic field concentrators to be selected to be correspondingly smaller.

In all refinements, it is preferred that the shell part is formed on, or comprises, a rotary dial or a rotary wheel. Preferably, the rotary part may be formed integrally with the rotary dial or rotary wheel. In such refinements, it is preferred that the rotary dial or the shell part is of "pot"-shaped form. The "lid" of the shell part may be connected integrally to a rotary part formed as sleeve part, or may be fastened separately thereto.

Preferably, the shell part is composed of a magnetically conductive material or comprises a magnetically conductive sleeve part and provides an outer ring for the magnetic field. The magnetic field for generating a braking moment runs through the first brake component and passes through the gap at the magnetic field concentrators, which are of magnetically conductive form. From the magnetic field concentrators, the magnetic field enters the shell part. There, the magnetic field lines run back, before magnetic field lines enter the first brake component again. Thus, a closed magnetic circuit is present, or closed magnetic field lines are present.

During a relative rotation of the first and the second brake component with respect to one another, a wedge effect arises at the magnetic field concentrators under the influence of a magnetic field, as is basically described in the above-mentioned U.S. Pat. No. 9,091,309 B2 and WO 2012/034697 A1. The disclosure of those documents is herewith incorporated by reference in their entirety. The braking torque in the case of the present invention is likewise generated by means of the wedge effect or the clustering at the magnetic field concentrators, even though the magnetic field concentrators cannot in themselves rotate but are fastened to the first or second brake component.

Preferably, at least a radial wall thickness of the shell part or of the sleeve part of the shell part is at least half as great as a gap width of the gap and/or a radial length of a magnetic field concentrator. Preferably, a radial wall thickness (of the sleeve part) of the shell part is greater than ¾ of the gap width of the gap. The radial wall thickness (of the sleeve part) of the shell part may in particular also be greater than a radial length of a magnetic field concentrator. By means of a sufficient wall thickness of the shell part composed of a magnetically conductive material or of the sleeve part of the rotary part, it can be ensured that the desired field strength of the magnetic field can be generated in the region of the rolling bodies in order to be able to generate a braking moment.

In all refinements, it is preferred that a length of the first brake component in the axial direction is greater than a length of a magnetic field concentrator in the axial direction. If the magnetic field concentrator is designed to be shorter in the axial direction than the first brake component, this leads to a three-dimensional concentration of the magnetic field in the edge region of the magnetic field concentrator. The magnetic field can pass through the gap practically only in the sections in which a magnetic field concentrator is situated.

Preferably, a length of the gap in the axial direction is at least twice a length of a magnetic field concentrator in the axial direction. It is also possible and preferable for two or more magnetic field concentrators to be arranged one behind the other in the axial direction.

Preferably, the first brake component is of substantially cylindrical form and comprises a main body, which is rotationally symmetrical or cylindrical at least in certain sections, as a core, and comprises the electrical coil or the electrical coils. It is also possible for a ball, for example, to be included for the mounting of a rotary dial, which ball may be arranged centrally on the distal end in order to provide a simple and low-friction bearing between the first brake component and the second brake component.

The electrical coil may, in the case of a "horizontal coil" being used, be wound in axial grooves and transverse grooves of the cylindrical main body (of the first brake component). In the case of a "radial coil" being used, the electrical coil may be wound in an encircling groove. Preferably, the respective grooves are at least partially filled or encapsulated with potting compound. This prevents magnetorheological medium or magnetorheological fluid from entering the region of the coil wires, which could lead to the demixing of the fluid.

The holder preferably has a cable lead through. Connection cables for the coil and/or sensor cables and the like can be led through the holder or through the cable lead through of the holder. In this way, easy assembly and inexpensive production are made possible.

Preferably, the holder has a receptacle for rotationally conjoined connection to the first brake component. Here, the holder may receive the first brake component in non-positively locking and/or positively locking fashion. During operation, the braking moment between the first brake component and the second brake component is dissipated via the holder.

Preferably, the holder has a cylindrical running surface for a bearing and supports the shell part rotatably on the holder.

On the cylindrical running surface, there is preferably arranged a seal for sealing off the gap, wherein the seal is in particular arranged closer than the bearing to the gap. In this way, the bearing is reliably protected from the magnetorheological medium. Such a refinement allows a compact construction and reliable operation. The bearing may for example be a plain bearing or rolling bearing.

The cylindrical running surface is preferably hardened and/or has a higher surface quality than the radially outer surface of the receptacle. Manufacturing costs can thereby be reduced.

In advantageous refinements, the cylindrical running surface has an outer diameter which is at least 3 mm smaller than an outer diameter of the receptacle of the holder.

The holder is preferably fastened to a bracket or to some other component.

In preferred refinements, the haptic operator control device comprises at least one magnetorheological brake device and may furthermore comprise at least one user interface, an operator control panel, a display, a touch-sensitive display with or without haptic feedback, and/or at least one sensor.

Also possible is the use in a haptic operator control device which comprises at least one magnetorheological brake device. A user interface, an operator control panel, a display, a touch-sensitive display with or without haptic feedback and/or at least one sensor is preferably also included. Such a refinement allows not only the operator control but at the same time also the display or outputting of information during the operator control. Thus, for example, an operator control dial which at the same time has an output display is made possible.

In all refinements, it is preferred that a difference between a clear inner diameter (of the sleeve part) of the shell part and an outer diameter of the first brake component is greater than 3 mm and less than 90 mm. It is likewise preferred that an outer diameter of the (sleeve part) shell part is between 5 mm or 10 mm and 120 mm. Preferably, a height of the shell part is between 5 mm and 120 mm. In all refinements, it is preferred that a control device is included which is designed to effect a variable braking action by means of the electrical coil.

Altogether, the present invention particularly preferably operates in accordance with the basic principle of wedge-action clamping, wherein a magnetic field concentrator sweeps past the walls with a certain spacing. A magnetic field gives rise to the wedge effect, such that a high braking moment can be generated.

Through the use of a "horizontal coil" it is furthermore also possible to achieve better scalability. In this way, it is made possible for a scalable and greater braking moment to be generated by means of longer magnetic field concentrators and an axially longer electrical coil. Here, the diameter of the first brake component does not need to be selected to be larger in order to conduct a corresponding magnetic field, because, with an axial lengthening of the core, the area of the core (cross-sectional area) also becomes larger. The axial length may also possibly be considerably reduced if only a relatively low braking moment is required. The structural space can be adapted accordingly.

A further advantage is that, even for mass production, the electrical connection cable for the electrical coil can be led out in a straightforward manner. Leak-tightness of the magnetorheological brake device, and scaling, can be made possible by simple means.

It is basically possible for a greater moment to be generated by the magnetorheological brake device by means of magnetic field concentrators which are longer (in an axial direction), because the effective length increases. At the same time, it is ensured by way of the larger core area that the magnetic field concentrators are always subject to a corresponding magnetic flux density. The magnetic field strength in the "wedge" at the magnetic field concentrators can be selected to be higher than in the prior art. Long magnetic field concentrators or multiple axially offset magnetic field concentrators can be used, to which an adequately strong magnetic field can be conducted.

In particular, in the case of a "radial coil" being used, the magnetic field generated by the electrical coil passes axially through the core and radially through the magnetic field concentrators and is closed axially via the (sleeve part or) the shell part or the outer cylinder. Here, the magnetic field lines are closed on the one hand in the one, for example lower or left-hand half, and on the other hand in the other, for example upper or right-hand half, of the shell part.

In simple refinements, the magnetic flux thus runs substantially two-dimensionally. Here, it is not of importance how long or how tall the magnetic field concentrators are designed to be. In this way, any desired scaling in terms of length can be achieved, because the magnetic field transmission area increases concomitantly.

By contrast, in the case of electrical coils wound concentrically about the longitudinal direction of the first brake component ("radial coils"), the cross-sectional area in the core remains the same, and can form a bottleneck for the magnetic field if the diameter is not changed. In the case of rotary dials in a motor vehicle, the core generally has a diameter sufficient to impart the desired braking moment. There, the required diameter of the first brake component is not particularly disadvantageous for the structural space requirement, the installation dimensions and the weight of the magnetorheological brake device. It is advantageous that, in the case of the static magnetic field concentrators that are now used, there is no change in rotational speed of rolling bodies, which can be disadvantageous.

If longer magnetic field concentrators are used, then the braking effect of a magnetic field concentrator which has a long extent in an axial direction can be better than that in the case of two short magnetic field concentrators which have the same overall length. This is inter alia because the fluid must be displaced over a longer distance, because the edge is further remote (hydrodynamic pressure). Two short star contours may in turn have advantages owing to a symmetrical construction.

In preferred refinements, the magnetorheological brake device has a diameter (of the sleeve part) of the shell part of between approximately 5 and 80 mm (+/−20%), in preferred refinements approximately 10 to 40 mm.

Altogether, the invention provides an advantageous haptic operator control device with a magnetorheological brake device ("MRF brake"). Here, the outer diameter of the MRF brake is normally predefined, in particular in haptic applications. There are ergonomic guidelines here. Therefore, the core cross section generally cannot be increased so easily, because, with this, the outer diameter also becomes larger (dial outer diameter; surface for the fingers). Furthermore, with increasing outer diameter, a greater blocking moment is again required, because the moment lever would therefore become larger (the finger-imparted force, that is to say the (tangential) force between the actuating finger(s) and the brake element or the outer surface of the brake element, must or should remain the same because, on the one hand, the user can only impart a certain force, and the required forces at the fingers (fingertips) are important for physical comfort during the actuation (operator control quality)).

The electrical coil (electric coil) may, in preferred refinements, extend axially. The magnetic field generated by the coil then passes radially through the core, then through the magnetic field concentrators and is closed via the outer cylinder (in each case through the opposite halves). This always remains the same irrespective of how tall (or long) the rolling bodies or MRF brake are or is.

The invention achieves the aim of obtaining an MRF brake which is as simple as possible but nevertheless easily scalable and which has a high braking moment whilst having a compact outer diameter.

Instead of a (cylindrical) coil wire, it is also possible for a flat material or wire with adapted contour composed of copper or some other suitable material to be used.

The core, the magnetic field concentrators and the outer cylinder may be manufactured from a simple steel (for example S235), without stringent requirements with regard to surface condition and hardness, which preferably has good magnetic characteristics. Those surfaces which move relative to one another and generate the braking torque may be rough and/or have a surface structure (for example knurling, pyramids . . . ).

The core together with electrical coil and potting compound are preferably centered and fixed in a "holder" (non-positively locking or positively locking connection), and the opposing torque is dissipated via said holder to a bracket or base plate or receiving plate or a housing. The holder preferably has a bore through which the cables are led. Preferably, a sealing element (for example O-ring) seals off the cable with respect to the holder or the interior space, such that no fluid can pass from the interior space to the outside via the cable. In addition to the (coil) cable, it is also possible for a temperature sensor cable or some other sensor cable to be led through said opening.

The holder may also be produced from a different material than the core, rolling body or outer cylinder. The diameter reduction of the holder at the running surface has the advantage that the friction radius for the sealing element becomes smaller, which reduces the overall friction. Furthermore, owing to the resulting increased structural height, a bearing element can be used which has a bearing outer diameter equal to the inner diameter of the shell part. This reduces the production costs of the shell part, and no shoulder necessitated by the manufacturing process (trepan) is required. The preferred rolling body height is between 3 and 6 mm, though may also be 1 or 2 mm. In this range, it is difficult to obtain good bearings or sealing elements if the inner diameter of the holder does not create additional structural height.

A decorative or other element, for example a rubber-lined dial, may be fitted over the outer cylinder or the shell part.

As viewed axially from above, there is preferably a ball or a spherical or ball-like component (may also be a hemisphere) between the outer cylinder and the potting compound. This guides the two parts relative to one another. Preferably, the ball is fixed in the potting compound, and the inner axial end side of the outer cylinder rotates relative thereto. A simple, low-friction and inexpensive bearing arrangement (bearing point) is thus created. A conical shape or the like is also possible. Instead of this type of bearing arrangement, use may however also be made of any other type of bearing arrangement (for example plain bearing arrangement or rolling bearing arrangement).

It is preferable if at least one component which is flowed through by the magnetic field is composed at least partially or entirely of the material FeSi3P.

It is basically possible for a star contour to be applied not to the core but also from the inside into the surrounding shell part or sleeve part. Such a construction may have advantages in terms of the coil design. Furthermore, space is obtained. It is also possible in this case for different coil variants to be selected. An axial coil or "horizontal coil" is possible. A coil which is wound around the axis of rotation is also possible. There is preferably no longer any core material radially outside the electrical coil, because otherwise the magnetic field could be closed via this, which can result in magnetic losses. It is also conceivable for more than one "horizontal coil" to be used depending on how it is positioned. A radial coil would also be easily conceivable, because, in this way, the field is closed via all "teeth" or magnetic field concentrators simultaneously.

In preferred developments of all refinements, the maximum torque that can be generated (course of the field strength in the effective gap; wedge effect) and/or the reaction time (the time until the moment acts in the event of abrupt electrical energization or step changes in electrical current, or step-change response) is dependent on the selected entry angle at the arms or the in each case distal ends of the magnetic field concentrators. The angle generated by the external design of the radial end of the arms and the opposing surface, and the surface length, influence the maximum torque that can be generated, and the reaction time, in the build-up of a magnetic field or the field strength in the effective gap. Shallower (smaller) entry angles and/or longer surfaces increase the attainable moment. Greater (steeper) entry angles and/or shorter surfaces shorten the reaction times. Shallower angles are for example an angle between 0° and 10°, or preferably between 10° and 20°. Larger angles are between 20° and 30° or between 30 and 45°. It is also possible for negative angles to be created, that is to say with inward curvature, for example −5°.

It may also be advantageous to mix different contours/angles/shapes. One serration/tooth of the star contour then generates relatively high moments at relatively low rotational speeds, the other serration/tooth generates relatively high moments at medium rotational speeds, and the third serration/tooth generates relatively high moments at high rotational speeds. A brake device can thus be provided which generates high moments over the entire rotational speed range.

A disk or an annular flange without a star contour is easier to manufacture and can thus be manufactured at relatively low cost. The braking power (braking moment) is however not the same. Depending on the requirements with regard to structural space, production costs and possible braking moment, it is thus possible to use either a star contour (for relatively high power densities) or else a continuous disk in the case of relatively low requirements with regard to the power density but relatively high requirements with regard to the production costs. The disk may be of rotationally symmetrical form.

However, different response times must additionally be taken into consideration in addition to the different braking moment of the various contours. The more magnetizable material is installed, the longer the magnetic field requires to magnetize all of the material and impart the full power (inductance). This means that less material shortens the response time of the actuator.

Thus, the response/switching times that are required for the application are an additional criterion in the selection of the contour. These requirements vary depending on the customer and intended use. Very fine ticks/ripples (alternating torque) require very short response times (a few milliseconds).

Typical dimensions or values of the contour elements or "teeth" of star contours amount to 5% to 15% of the overall diameter. For example, in one specific refinement, the maximum diameter of the star contour (with outwardly projecting contour elements or "teeth") is 36 mm, and the height of a contour element or magnetic field concentrator or of the teeth amounts to approximately 2.5 mm. A minimum diameter thus amounts to 31 mm. This corresponds to a relative size of 7% of the diameter. A star contour with typical deviations from the disk shape has for example depressions of 5-10% of the overall diameter.

Preferably, a range of the depth of the depressions (or height of the contour elements) is from 0.25% to 25%. In particular between 0.5% and 10%.

The manufacturing costs become lower with smaller heights of the teeth (contour elements). It may therefore be advantageous to use only very small deviations from the round disk.

A star contour with relatively small deviations from the disk shape would for example be small indentations of 1-3% of the overall diameter.

The width of the star contour may also vary. In preferred refinements, the width lies between 1 mm and 25 mm. Specifically, widths of 3 mm and 6 mm have been successfully tested.

Preferably, in particular, the haptic operator control device according to the invention is used to generate a high power density of a brake device or brake unit with magnetorheological fluid, wherein this is achieved by means of contour elements which concentrate the magnetic field.

In particular, in this way, the carbonyl iron particles are drawn out of the surroundings and concentrated in the magnetic field transition region.

With the above and other objects in view there is provided, in accordance with the invention, a method for generating an increased power density of a brake device with two brake components and with magnetorheological fluid and with at least one electrical coil, the increased power density being generated by means of a static brake component and a brake component which moves in rotation about the central axis of the static brake component and which is magnetically directly in contact with said static brake component, contour elements which concentrate the magnetic field being arranged on and in particular connected rotationally conjointly to one of the two brake components.

A further method serves for generating a high power density by means of a brake device with magnetorheological fluid and at least one electrical coil, said high power density being generated by means of a static element and an element which moves in rotation about the central axis of the static element and which is magnetically directly in contact with said static element, which elements concentrate the magnetic field.

In particular, carbonyl iron particles are drawn out of the surroundings and concentrated in the magnetic field transition region.

Preferably, the brake component which moves in rotation about the central axis has a unipartite form.

Other features which are considered as characteristic for the invention are set forth in the appended claims.

Although the invention is illustrated and described herein as being embodied in a haptic operator control device for vehicles, and a method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
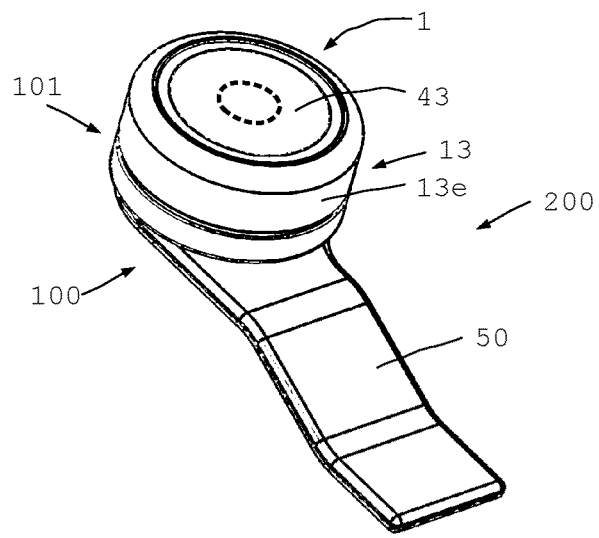
FIG. 1 shows a schematic three-dimensional view of a haptic operator control device for vehicles having a magnetorheological brake device.

Referring now to the figures of the drawing in detail and first, in particular, to FIG. 1 thereof, there is shown a haptic operator control device according to the invention for vehicles 100 as an appliance component 200. A magnetorheological brake device 1 is used or included in the haptic operator control device for vehicles 100.

FIG. 1 shows a haptic operator control dial 101. The operator control dial is fastened by means of a bracket 50. The operator control dial 101 is operated by way of the shell part 13 or sleeve part 13e. A user interface 43 can additionally be utilized to impart information.

In this exemplary embodiment, the magnetorheological brake device 1 has a shell part 13 or rotary part or sleeve part 13e, which is rotatably mounted. The torque required for rotating the shell part 13 or rotary part 13 is adjustable.

The user interface 43 may be arranged on the top side of the magnetorheological brake device 1. Such a user interface 43 may for example be formed as a display device or else as a touch-sensitive input facility (touchpad, movement and gesture control, image recognition . . . ).

A haptic operator control device 100 may for example be used for operator control in a motor vehicle. In a vehicle, the haptic operator control device 100 may be used for example for the operator control of air-conditioning systems, radios, the entertainment system, the navigation system, the adaptive cruise control system, the driver assistant, for the setting of the seats, and for the operator control of the infotainment system.

Figure 2:
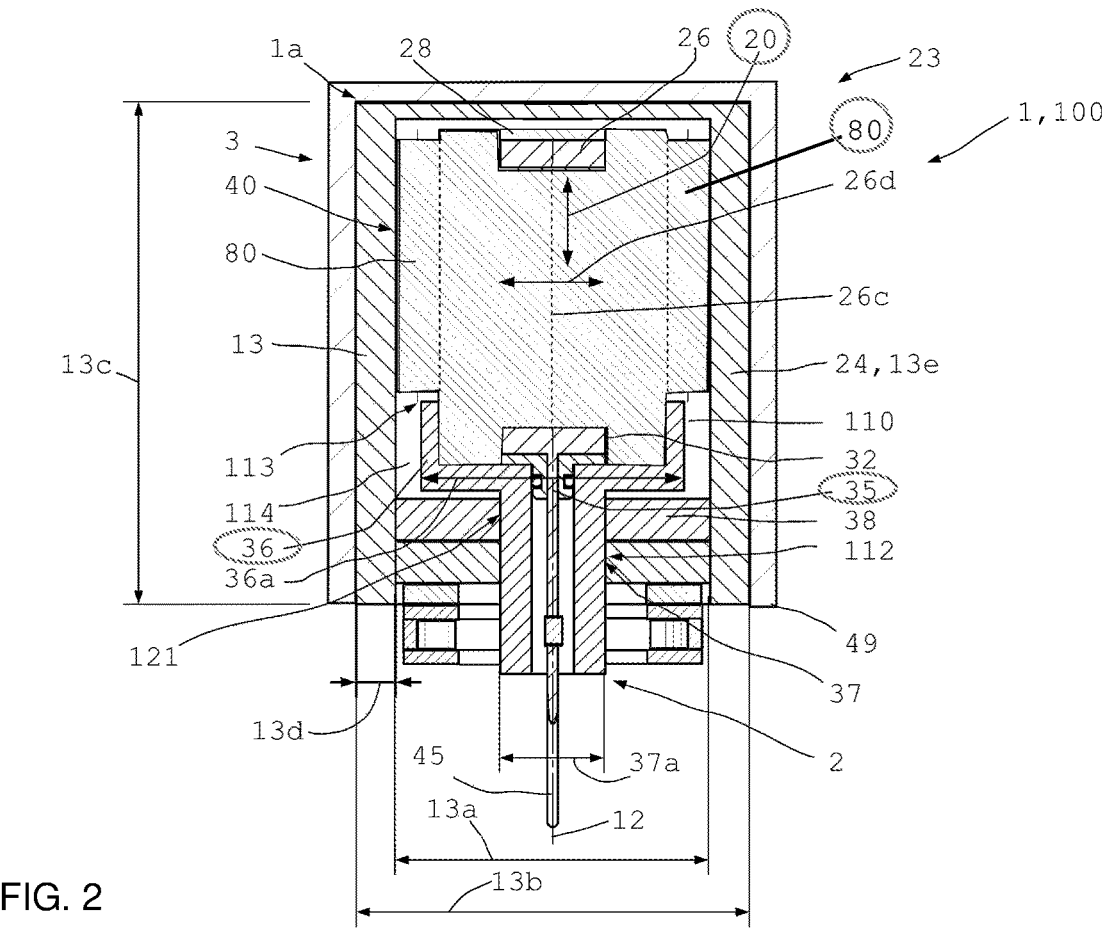
FIG. 2 shows a cross section of a further haptic operator control device for vehicles having a magnetorheological brake device.

FIG. 2 shows a haptic operator control device 100 according to the invention in section, having a magnetorheological brake device 1. It is possible to see the transverse grooves 32 into which the electrical coil 26 of the magnetic field generating device 113 is wound at the axial ends of the core 21. Here, connection cables 45 are led out in a downward direction. The magnetic field extends within the core 21 perpendicularly to the coil plane 26c in a radial direction 26d. For closure purposes, potting compound 28 is provided in each case at both ends in an axial direction. In the region of the cable leads through 35, a separate seal is provided by means of, for example, the illustrated O-ring or the like.

The wall thickness of the in this case cylindrical shell part is calculated from that between outer diameter 13b and inner diameter 13a of the shell part 13.

A length or height 13c of the magnetic field concentrator 80 and of the shell part 13 or of the sleeve part 13e or of the second brake component 3 in an axial direction 20 amounts to preferably between 1 mm and 100 mm or between 5 mm and 90 mm. On the outside, a covering 49 may be applied to the second brake component 3, such that the external appearance of the rotary dial 23 is determined substantially by the surface of the covering 49.

The material of the sleeve part 13e or of the shell part 13 as a whole is magnetically conductive and serves for closing the magnetic circuit. A wall thickness 13d of the sleeve part 13e is preferably at least half as large as a radial extent of the magnetic field concentrators 80. The shell part 13 forms an outer ring 24.

The diameter 36a of the receptacle 36 is preferably considerably larger than the diameter 37a of the cylindrical running surface 37. In this way, the friction at the seal 38 is reduced. It is furthermore possible for standardized bearings to be used.

A (flange-mounted) sensor (rotary encoder, angle encoder) which is not illustrated detects the rotational speed (the rotational angle) of the operator control unit.

Here, the haptic operator control device 100 having the magnetorheological brake device 1 is mounted in cantilevered fashion. The second brake component 3 is in this case received only at the first end of the closed chamber 110 on an end section 121 of the first brake component 2, that is to say the second brake component 3 is mounted only at the first bearing point 112 by the bearing arrangement 30. In the event of a change in the volume within the closed chamber, the second brake component 3 can easily move back and forth. Here, it is again assumed that the first brake component 2 is static. In this case, a part of the diameter of the first brake component 2 moves out or in at the first bearing point 112. The volume 114 of the closed chamber 110 changes. The system is advantageously practically always at ambient pressure within the given range of movement. An additional load on the seal 38 is prevented.

Figure 3A:
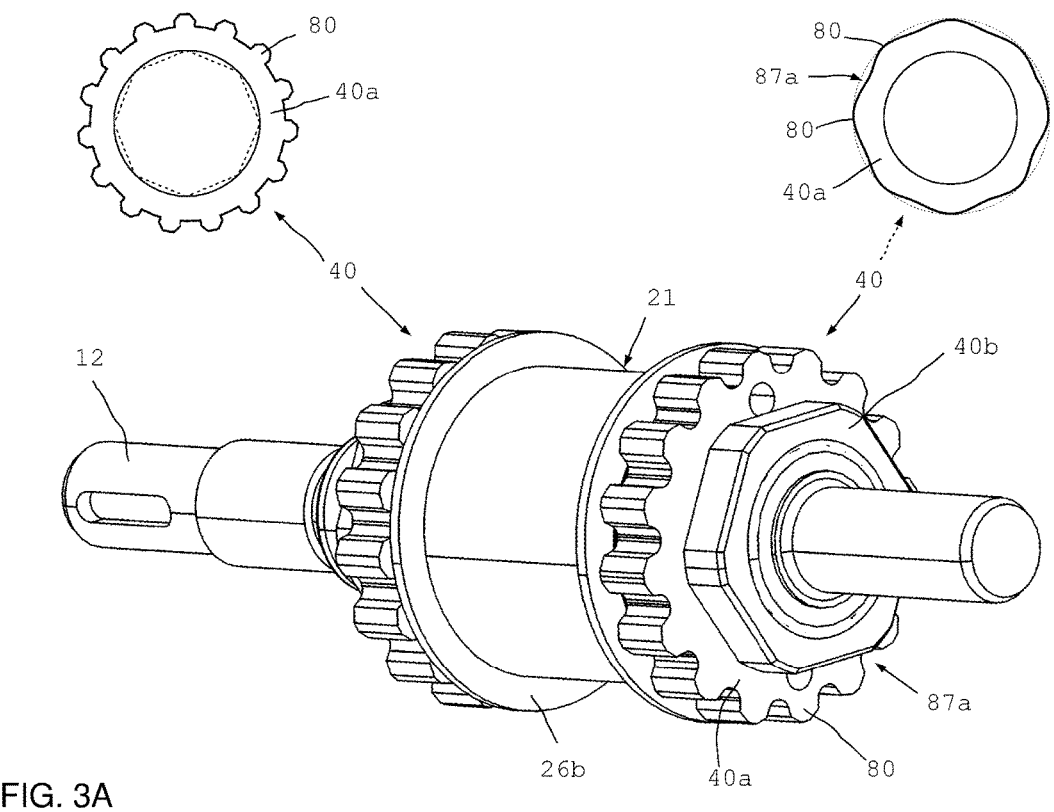
FIGS. 3A, 3B show a magnetorheological brake device for a haptic operator control device for vehicles having a wedge damper with two star contours, in each case on one side of the electrical coil.
Figure 3B:
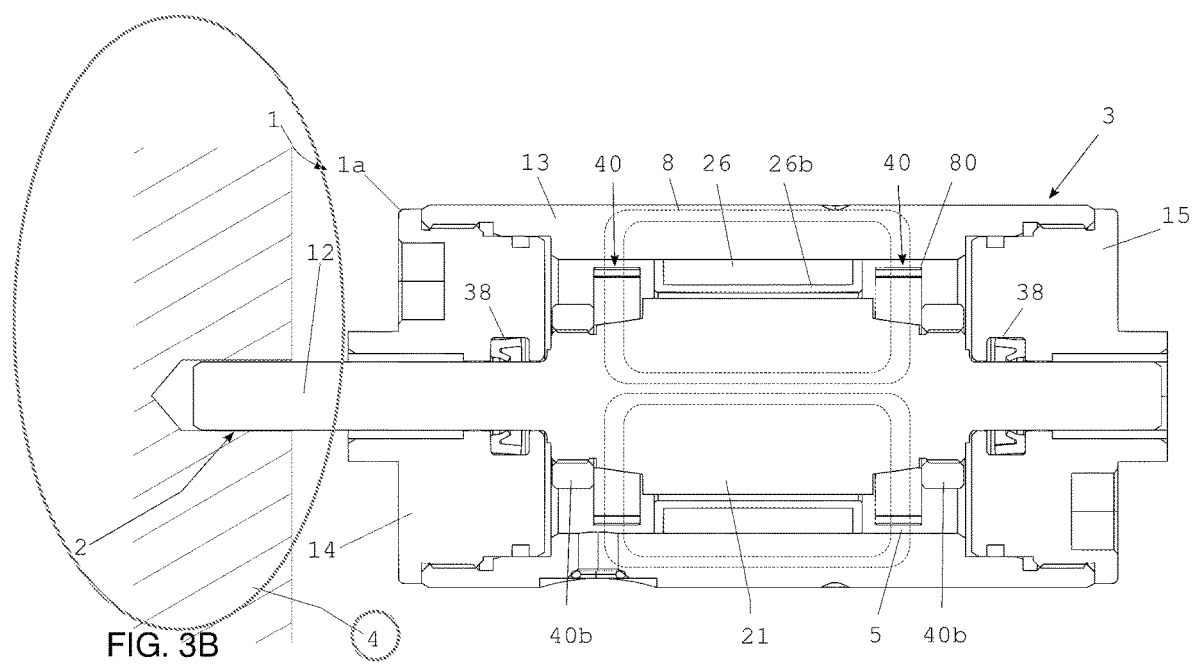

FIGS. 3a and 3b show another magnetorheological brake device 1 for a haptic operator control device 100. The magnetorheological brake device 1 comprises a brake housing 1a which, in this case (FIG. 3b), is composed substantially of the two closures or lids 14, 15 and the shell part 13.

The first brake component 2 comprises the axle 12, which, at at least one side, is led in sealed fashion out of the brake housing 1a. The second brake component 3 comprises the brake housing 1a. The operator control dial 101 is received or formed at the outside on the brake housing 1a.

The axle 12 may also have a passage opening and for example a longitudinal bore.

In general, the first brake component 2 is received rotationally fixedly, by means of a holder which is not visible here, on a bracket 50 or on other parts or components. Then, at least the shell part 13 forms a rotatable part of an operator control dial 101 or the like. The torque required for rotating the shell part 13 is settable. It is however also possible for the brake housing 1a to be mounted so as to be rotationally fixed, and for the axle 12 to be rotatable.

FIG. 3A illustrates the magnetorheological brake device 1 without the external brake housing 1a and without the shell part 13. Here, two star contours 40 are included, which are received on the core 21 so as to be spaced apart from one another in the axial direction 20 along the axle 12. Each star contour 40 is formed as a separate part and is in this case fixedly clamped on the core 21 by way of a separate threaded nut 40b. The star contour may be of cylindrical or conical design on the inside.

The core 21 and the star contours 40 may possibly also have mutually adapted non-circular outer and inner contours respectively in order to ensure that the star contour 40 is received rotationally conjointly on the core 21. FIG. 3a shows, at the top left, a view of a star contour 40 which has a passage opening on the inside. The inner contour may be of cylindrical form (shown by a solid line) or else non-circular form (polygon, oval etc.) (shown by dashed lines).

The magnetic field concentrators 80 are formed radially at the outside on the star contour 40. In each case one depression 87a is formed between the individual magnetic field concentrators 80. Here, all magnetic field concentrators 80 of a star contour 40 are formed integrally on the star contour 40. Rotatable rollers or other rotary bodies are not provided as magnetic field concentrators 80 or otherwise.

The two star contours 40 of the magnetorheological brake device 1 as per FIG. 3a may be of identical form. It is however also possible for different star contours 40 to be arranged at the right-hand and left-hand ends. In particular, the magnetic field concentrators (which may also be referred to in all refinements as contour elements) may also be formed differently on the star contours 40 at the right and at the left (cf. the star contours shown in each case individually in the upper part of FIG. 3a). It is also possible for in each case two (or three) different star contours to be received on one or each end. Here, the contour elements may be of geometrically different design and have different dimensions in relation to one another.

It can be seen in the cross section as per FIG. 3B that the axle 12 (also referred to as shaft) is sealed off with respect to the brake housing 1a by way of seals 38. Received between the two star contours 40 is the coil holder 26b, on which the electrical coil 26 is wound. The electrical coil 26 may directly adjoin the shell part 13, and is then held in a manner magnetically isolated from the core 21. Alternatively, the electrical coil 26 may directly adjoin the core 21, and is then held in a manner magnetically isolated from the shell part 13.

A magnetic field line 8 is shown by way of example. The magnetic field runs between the star contours 40 substantially axially through the shell part 13 and, in the region of the two star contours 40, passes approximately radially through the gap 5 situated there, and is concentrated by the magnetic field concentrators 80 such that a wedge effect arises in the region of the magnetic field concentrators 80. The magnetic field is closed in the axial direction 20 within the core 21.

In principle, the magnetorheological brake device 1 has a wedge bearing with two star contours 40. In the center, there is a magnetically conductive axle or shaft 12, radially around which an electrical coil 26 is wound. The electrical coil 26 generates a magnetic field 8 which is amplified by the shaft 12 as core 21. The magnetic field lines 8 lead through the star contour 40 on one side and onward via the magnetically conductive outer wall in the shell part 13 to the second star contour 40 on the other side, via which the field lines return to the shaft 12 and are closed. The magnetic field 8 is thus utilized in a highly efficient manner. MRF as damping medium is situated in the gap 5 between star contour 40 and outer wall (shell part 13).

In this construction, different star contours can be applied. For this purpose, the shaft 12 has a conical receptacle onto which the annular flanges 40a with the star contours 40 respectively formed (for example milled) thereon are pushed. A threaded nut 40b behind the annular flanges 40a then, when tightened, presses the annular flanges 40a onto the shaft 12.

Figure 4:
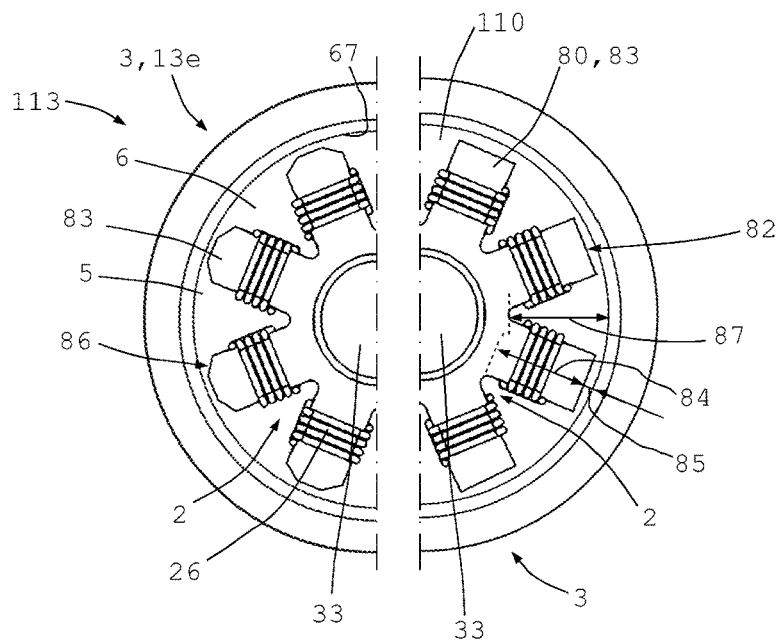
FIG. 4 shows another cross section of a magnetorheological brake device.

FIG. 4 shows two schematic cross sections of other embodiments with a (cylindrical) main body 33. The star contour with the magnetic field concentrators 80 are formed by individual outwardly projecting radial arms 83 wherein the radial arms 83 are formed integrally with the core 21 and are composed of a material with good magnetic conductivity.

Here, each individual arm 83 is enwound with an electrical coil 26 of the magnetic field generating device 113. The electrical coils 26 are preferably actuated jointly, though may also be actuated differently and/or individually. The distal and in this case radially outer ends 82 of the arms 83 may be of wedge-shaped, rounded or else angular form.

In the case of radially inwardly projecting arms 83 as magnetic field concentrators 81, it is correspondingly possible for the radially inner end, as distal end 82, to be of wedge-shaped, rounded or else angular form. The maximum moment that can be generated, and the reaction time, are influenced by the shape.

The arm height 84 is considerably greater (factor of 10, 50, 100 or far greater) than the radial gap height 85 between an outer end of an arm 83 and an inner surface 67 of the shell part 13.

The radial gap height 85 between an outer end of an arm 83 and an inner surface 67 of the shell part 13 is however considerably smaller than a radial gap dimension 87 between the outer surface 86 (core 21 or else surface of a potting compound 28) of the first brake component 2 adjacent to the arm 83 and the inner surface 67 of the shell part 13. Preferably, the ratio of the radial gap dimension 87 to the radial gap height 85 is greater than 2, 5 or 10 or more. A certain enlargement is important for the wedge formation.

Figure 5:
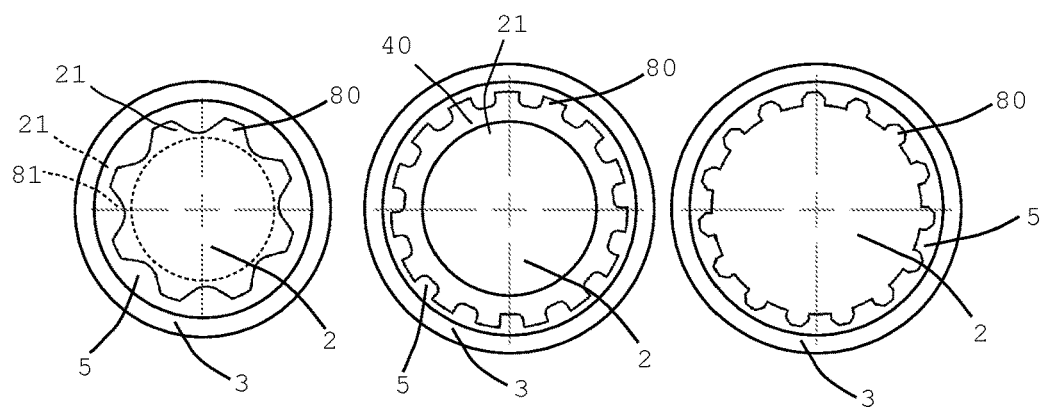
FIG. 5 shows further schematic cross sections of a magnetorheological brake device in section.

FIG. 5 shows three different outer contours of a core 21 on a shell part 13 formed with a cylindrical cavity. The magnetic field concentrators 80 which project radially outward on the star contours 80 can be shaped differently. The outwardly projecting magnetic field concentrators 80 form a gap 5 which is variable over the circumference, such that the magnetic field 8 is concentrated in the region of the magnetic field concentrators 80 when it passes from the core 21 into the shell part 13. The star contours 40 are formed by annular flanges with magnetic field concentrators 80 projecting outward therefrom. The annular flanges are in each case of hollow form and, on the inside, may be of non-circular form in order to ensure a rotationally conjoint connection to the core, which is then also of non-circular design there.

In a purely schematic illustration, the left-hand image of FIG. 5 shows, in dashed lines, a variant in which the magnetic field concentrators 81 project inward and the core 21 is provided at the inside. An inverse image then arises. Different characteristics can be attained by way of the shaping of the ends of the magnetic field concentrators 80 or 81. It is thus possible for the focus to be placed on a higher braking moment or a faster reaction time.

Figure 6:
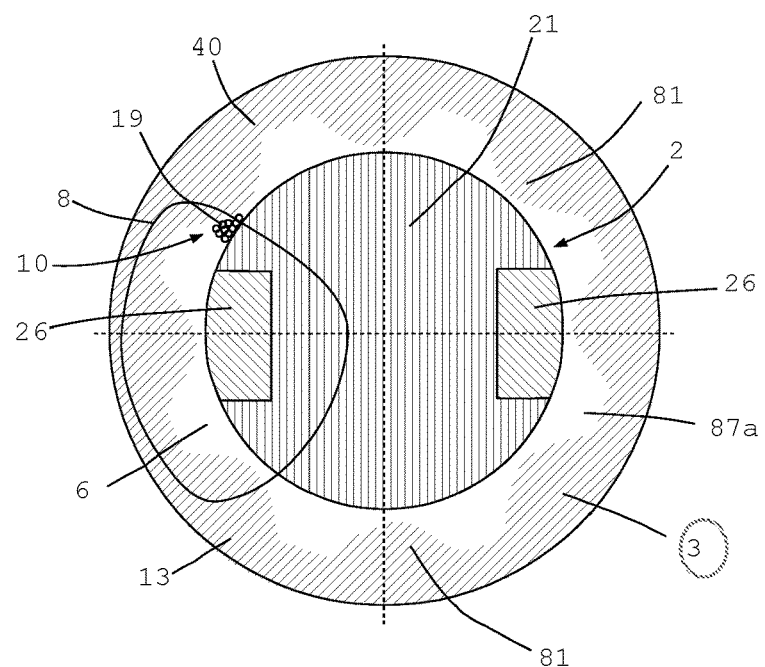
FIG. 6 shows a yet further schematic cross section of a magnetorheological brake device.

FIG. 6 shows a schematic variant with a central cylindrical core 21 and with a shell part 13, from which magnetic field concentrators 81 project radially inward at periodic intervals. A highly schematic magnetic field line 8 is shown, which passes radially through the gap 5 between the core 21 and a magnetic field concentrator 81. At the constriction, a cluster of the particles 19 of the MRF interlinks in the gap 6 filled with the medium 6 and forms a wedge (cluster) in an acute-angled region 10, generating a high braking moment.

Aside from the variant illustrated, in which the electrical coil is wound around the core in the axial direction, a variant is also possible in which the electrical coil 26 is wound radially around the rotary axle (2).

Figure 7A:
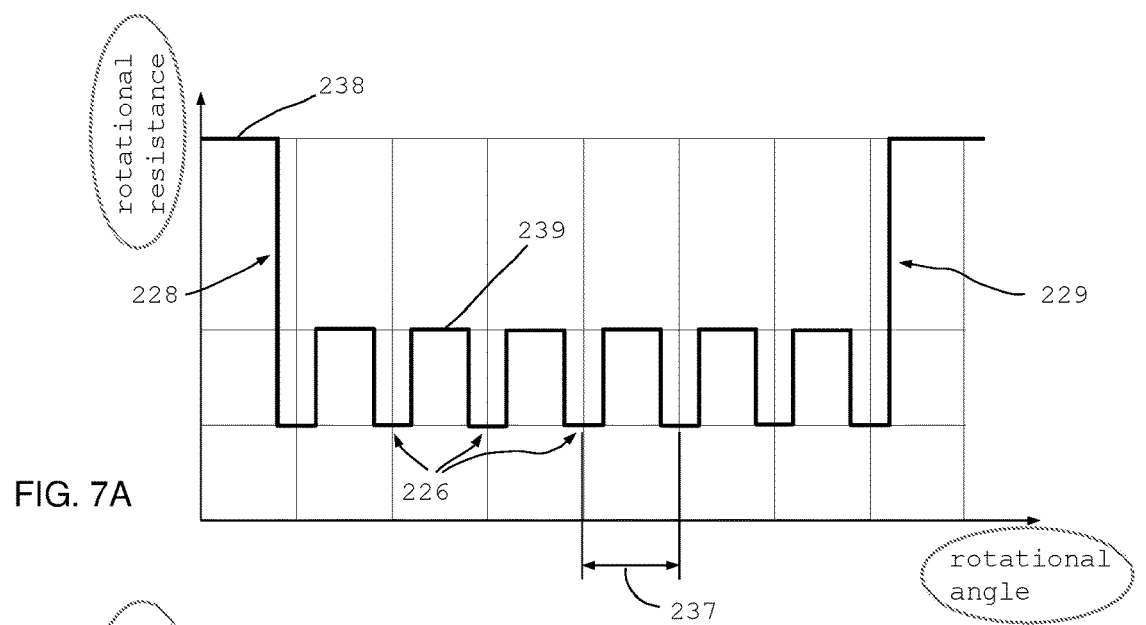
FIG. 7A-7C show possible courses of the torque versus the rotational angle of a haptic operator control device for vehicles having a magnetorheological brake device.
Figure 7B:
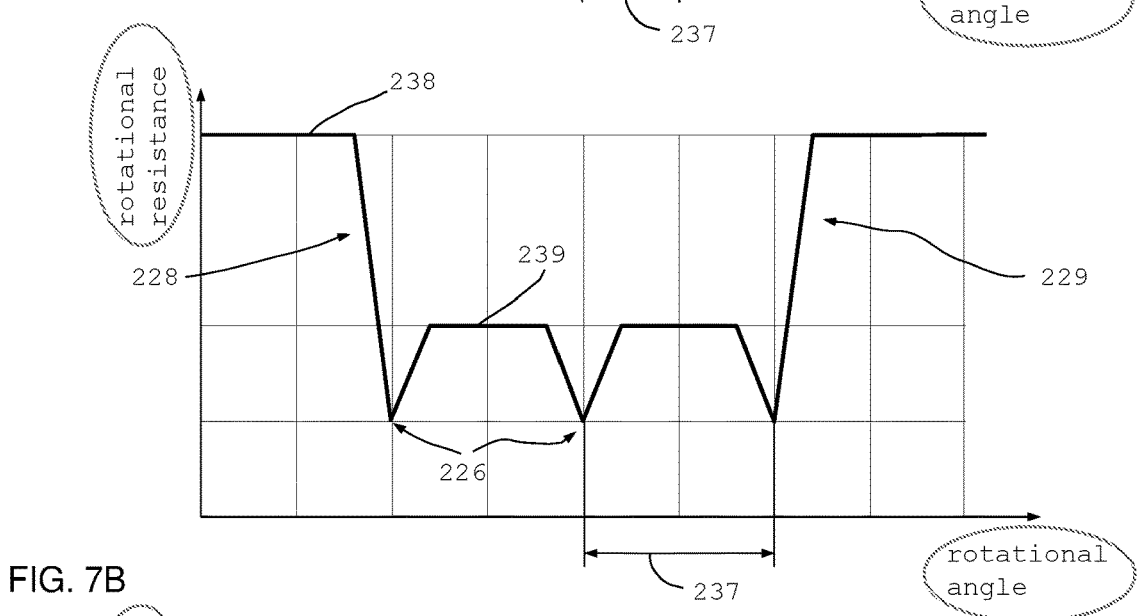
Figure 7C:
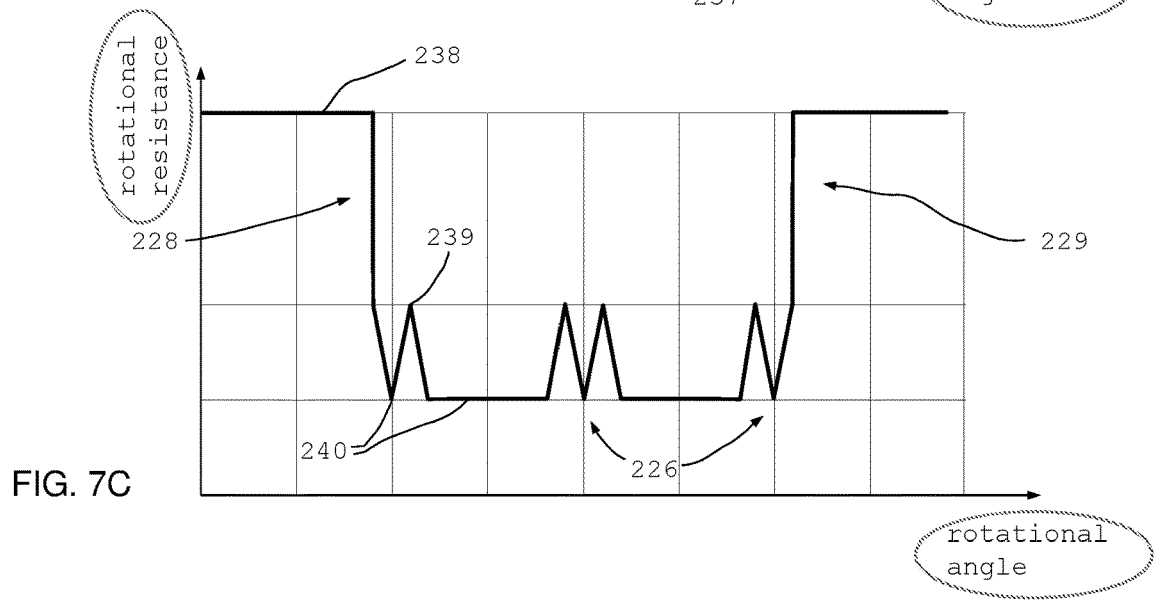

FIGS. 7a, 7b and 7c show possible design variants for the control of a dynamically generated magnetic field or of a dynamically generated braking moment as a function of the rotational angle.

Here, FIG. 7a shows a variant in which a rotary dial is used as a haptic operator control aid. The illustration shows the rotational resistance versus the rotational angle. By means of the controller 27, a left-hand end stop 228 and a right-hand end stop 229 can be generated. In the event of onward rotation of the rotary dial 23, a strong magnetic field or stop moment 238 is generated there, whereby the rotary dial 23 is subjected to a high resistance which opposes a rotational movement. The user is provided with the haptic feedback of an end stop.

Here, a rastering of the rotational movement may be implemented or generated (ripples/ticks). For example, this may be used to navigate through a graphical menu and select menu points. Here, directly adjacent to the left-hand end stop 228, a first raster point 226 is provided which, during operator control, corresponds for example to a first menu point. If it is intended to select the next menu point, the rotary dial 100 must be rotated clockwise. For this purpose, the dynamically generated higher magnetic field or detent moment 239 or the frictional moment thereof must be overcome before the next raster point 226 is reached. In FIG. 7a, for a certain angle range in each case at the raster points 226 and at the regions situated in between, an in each case constant magnetic field is generated which is considerably lower at the raster points than in the regions situated in between, and is once again considerably lower than at the stops 228, 229. A set moment, or else the structurally defined base moment 240, may act at the raster points 226.

An angular interval 237 between individual raster points is dynamically variable and is adapted to the number of available raster points or menu points.

FIG. 7b shows a variant in which, toward the end stops 228, 229, the magnetic field does not increase abruptly but rather follows a steep course. Furthermore, at the raster points 226, ramp-like gradients of the magnetic field are provided in each case to both rotational sides, whereby the rotational resistance increases in the corresponding directions of rotation. Here, with the same operator control device 100, only three raster points 226 are provided, the angular interval 237 of which is greater than in the example as per FIG. 7a.

FIG. 7c shows a variant in which a relatively low rotational resistance prevails between individual raster points 226 and an increased magnetic field 239 is generated in each case only directly adjacent to the raster points 226, in order to allow latching at the individual raster points 226 and at the same time provide only a low rotational resistance between individual raster points.

Mixing of the operating modes and of the magnetic field courses of FIGS. 7a, 7b and 7c is basically also possible. For example, in different submenus, a correspondingly different setting of the magnetic field course may be implemented (torque versus angle).

It is also possible in all cases that, for example in the case of a ripple (raster), switching is performed no longer, as before, between low and high current intensity with the same polarity (that is to say for example +0.2 to +0.8 A=ripple), but rather with alternately changed polarity, that is to say from +0.2 to +0.8 A and then the next ripple with −0.2 A to −0.8 A and then the next moment peak from +0.2 to +0.8 A etc.

It is also possible in all cases that the operating modes of FIGS. 7a, 7b and 7c or mixing of the operating modes are selected by way of speech commands. The user selects a function (volume, station selection . . . ) by speech input (with local or remote speech recognition, for example by Alexa, Amazon Echo, Siri, Google speech input . . . ). The magnetorheological brake device then provides a corresponding operating mode (volume=raster with increasing braking moment for increasing volume; radio station selection=raster with different step width, and low braking moment in between, until station is found).

The preferably low-alloy steel may comprise a residual magnetic field. The steel is preferably demagnetized at regular intervals or when required (inter alia by way of a special alternating field).

The material FeSi3P (silicon steel) or a similar material is preferably used for the components through which the magnetic field flows.

In all cases, speech or sound-based control may be implemented. With speech control, the brake device can be controlled adaptively.

When the rotary unit is not being rotated, that is to say the angle is constant, the electrical current is preferably decreased continuously over time. The electrical current may also be varied in a speed-dependent manner (rotational angle speed of the rotary unit).

The invention claimed is:

1. A haptic operator control device for a vehicle, the control device comprising:
 a magnetorheological brake device with a brake housing having a static holder and with at least two brake components wherein one of said brake components is connected rotationally conjointly with said holder and said two brake components are continuously rotatable relative to one another;
 said two brake components including a first brake component extending in an axial direction and having a core that extends in the axial direction and that is composed of a magnetically conductive material, and a second brake component having a hollow shell part that extends around said first brake component;
 a magnetorheological medium at least partially filling an encircling gap formed between said first and second brake components;
 at least one electrical coil accommodated in said brake housing;
 at least one star contour arranged between said shell part and said core, said at least one star contour having magnetic field concentrators formed thereon, with said magnetic field concentrators projecting radially into said encircling gap, forming said encircling gap with a varying gap height in a region of said at least one star contour.

2. The haptic operator control device according to claim 1, wherein at least one of said magnetic field concentrators having a cross-sectional area which tapers toward a distal end.

3. The haptic operator control device according to claim 1, wherein at least one of said magnetic field concentrators is rounded at a distal end.

4. The haptic operator control device according to claim 1, wherein said core comprises a multiplicity of arms and/or said shell part comprises a multiplicity of arms forming said magnetic field concentrators, which project radially.

5. The haptic operator control device according to claim 4, wherein at least one of said arms is surrounded by an electrical coil.

6. The haptic operator control device according to claim 4, wherein each of a multiplicity of said arms is surrounded by an electrical coil.

7. The haptic operator control device according to claim 1, wherein said least one electrical coil is wound in the axial direction around said core and is configured to generate a magnetic field in a radial direction.

8. The haptic operator control device according to claim 1, wherein said at least one electrical coil is wound around said axle and is configured to generate a magnetic field in an axial direction.

9. The haptic operator control device according to claim 8, wherein said electrical coil is accommodated radially between said core and said shell part.

10. The haptic operator control device according to claim 1, wherein said electrical coil is fastened at an inside to said shell part or is wound around said core.

11. The haptic operator control device according to claim wherein said at least one star contour is one of at least two star contours accommodated in said brake housing.

12. The haptic operator control device according to claim 11, wherein said two star contours are accommodated so as to be axially spaced apart from one another.

13. The haptic operator control device according to claim 11, wherein said at least two star contours have different outer contours.

14. The haptic operator control device according to claim wherein at least one said star contour is formed as a separate annular flange with radially projecting magnetic field concentrators.

15. The haptic operator control device according to claim 1, wherein at least one said star contour has radially inwardly projecting magnetic field concentrators and is fastened magnetically conductively to said shell part.

16. The haptic operator control device according to claim 1, wherein said electrical coil is disposed to generate a magnetic field running through said core and said star contour with said magnetic field concentrators and through said encircling gap and a wall of said shell part.

17. The haptic operator control device according to claim 1, wherein said shell part has a cylindrical inner surface over at least one axial section.

18. The haptic operator control device according to claim 1, wherein said second brake component is mounted for axial displacement on said first brake component in order to allow volume compensation in an event of temperature changes and/or in an event of leakage.

19. The haptic operator control device according to claim 1, further comprising a rotary dial or a rotary wheel disposed on said shell part.

20. The haptic operator control device according to claim 1, wherein said at least one electrical coil is configured to generate magnetic fields having magnetic field strengths of greater than 350 A/m in said gap.

21. A method for generating an increased power density of a brake device with magnetorheological fluid and at least one electrical coil, the method comprising:

providing the brake device with a static brake component and a brake component that moves in rotation about a central axis of the static brake component and that is magnetically in direct contact with said static brake component;

generating a magnetic field with the at least one electrical coil; and providing contour elements on, and connected rotationally conjointly to, one of the two brake components, and using the contour elements to concentrate the magnetic field to thereby increasing the power density of the brake device.

22. A method for generating a high power density of a brake unit with magnetorheological fluid and at least one electrical coil, the method comprising:

providing the brake unit with a static element and an element that moves in rotation about a central axis of the static element and is in direct magnetic contact with the static element;

generating a magnetic field with the electrical coil; and concentrating the magnetic field with the elements so as to generate the high power density of the brake device.

23. The method according to claim 22, wherein the concentrating step comprises drawing carbonyl iron particles contained in the magnetorheological fluid out of the surroundings and concentrating the particles in a magnetic field transition region.

* * * * *